United States Patent [19]

Eiermann et al.

[11] Patent Number: 4,516,872

[45] Date of Patent: May 14, 1985

[54] APPARATUS FOR FASTENING ELECTRIC STRUCTURAL PARTS INTO THE CONNECTING HEAD OF ELECTRICAL THERMOMETERS

[75] Inventors: Kurt Eiermann, Pfungstadt; Thomas Kayser, Dietzenbach, both of Fed. Rep. of Germany

[73] Assignee: Degussa Aktiengesellschaft, Frankfurt am Main, Fed. Rep. of Germany

[21] Appl. No.: 556,116

[22] Filed: Nov. 29, 1983

[30] Foreign Application Priority Data

Dec. 3, 1982 [DE] Fed. Rep. of Germany ... 3244718[U]

[51] Int. Cl.³ .............................................. F16B 1/04
[52] U.S. Cl. ..................................... 403/24; 403/349; 411/544
[58] Field of Search ........................ 403/349, 24, 25; 411/349, 549, 544

[56] References Cited

U.S. PATENT DOCUMENTS 2,723,876 11/1955 Langlois et al. ............... 403/349 X
3,943,611 3/1976 Schenk .................................. 411/347

Primary Examiner—Andrew V. Kundrat
Attorney, Agent, or Firm—Cushman, Darby & Cushman

[57] ABSTRACT

An apparatus for fastening an electrical device into the connecting head of an electrical thermometer includes a fastener arrangement for the base plate of the temperature probe which consists of a screw, a casing and helical spring, with the spring slidable into the casing which is provided with a J-shaped notch or groove and a flange for engaging the helical spring. In the notch there is engaged a pin which is formed in the bore hole of the electrical device. By turning the casing there is accomplished a fastening of the part according with a type of bayonet locking.

3 Claims, 2 Drawing Figures

APPARATUS FOR FASTENING ELECTRIC STRUCTURAL PARTS INTO THE CONNECTING HEAD OF ELECTRICAL THERMOMETERS

BACKGROUND OF THE INVENTION

The invention is directed to an apparatus for fastening electrical parts, especially measurement converters, into the connecting heads of electrical thermometers by means of fasteners consisting of screws, a casing and a helical spring.

With electrical thermometers, such as resistance thermometers or thermocouples, the connecting elements for the connecting of the thermoprobe with the recording instrument for the most part are mostly placed in a special housing, the connection head. This connection head consists of a base body and a cover which is connected with the base body by means of a flap hinge or screws.

The base body of the connecting head is normally firmly joined with the protective tube of the electrical thermometer via a screw coupling. The actual measuring probe of the thermometer is located inside the protective tube either fixedly joined with this or loosely inserted as a measuring insert. The free ends of the measuring probe are located in the connecting head and are frequently constructed as screw connections, which are mounted on a carrier body, for example made of porcelain. The base body also carries a cable screw connection through which the connecting cable extends.

The inner space of the connecting head is customarily only insignificantly larger than is needed by the space requirement of the connecting elements of the measuring probe. Therefore it is not normally possible to accommodate additional structural elements as, for example, measuring converters in standard connecting heads without changes in construction.

The temperature probes customarily are connected by screws with the base body of the connecting head. Thereby it is advantageous to use fasteners consisting of screws, a casing and helical spring in order that there can be obtained a closed form and good heat conducting contact between probe and protecting tube at the bottom of the protecting tube.

It is known to include an additional electrical device, as, for example, a measuring converter, in the connection head by eliminating mounting on the carrier and mounting the part directly on the bottom plate of the temperature probe which is located within the connecting head. The mounting is carried out normally with screws from the underside of the bottom plate. However, this has the disadvantage that the part can only be removed with difficulty if the bottom plate, e.g., through corrosion, is jammed tight in the connecting head and there is no possibility of getting near to the fastening screws on the underside of the bottom plate.

Therefore it is an object of the present invention to provide an apparatus for fastening an electrical device, especially of measuring converters, into the connecting head of an electrical thermometer by means of fasteners consisting of screws, a casing and helical spring with which the part can be accommodated in easily changeable manner in the spatially limited inner space of the connection head.

SUMMARY OF THE INVENTION

This object is attained according to the invention by providing the fastener fitted electrical device disposed within the apparatus with bores having one or more pins on the interior thereof and a casing in which the helical spring is located and having in the upper area a J-shaped notch or channel engageable with the pin and at the lower edge is provided with a flange.

Advantageously the disposition of this casing is arranged so that the flange of the casing is located under the end winding of the helical spring so that the casing end is pressed on the bottom plate of the temperature probe. It is also advantageous if the casing is open on one side in the lower area so that it can be subsequently slid over the helical spring and also can be removed in the same way.

The electrical device is provided with one or more bores passing through it, which bores have a diameter and arrangement to receive the fasteners of the bottom plate which are fitted on the base body of the connection head. The fasteners in this case may comprise screws, the casing and the helical spring or springs which is arranged over the casing between bolt head and bottom plate. According to the invention, there is disposed over this helical spring a further casing which at the lower edge is flanged inwardly and therewith is anchored by the helical spring. This casing in the upper area has one or more J-shaped notches, depending on the number of pins arranged in the bore holes of the part. These pins are inserted in the upwardly open notches and through a simple turning of the casing the part is secured to the fastener like a type of bayonet locking.

DETAILED DESCRIPTION

Figure 1:
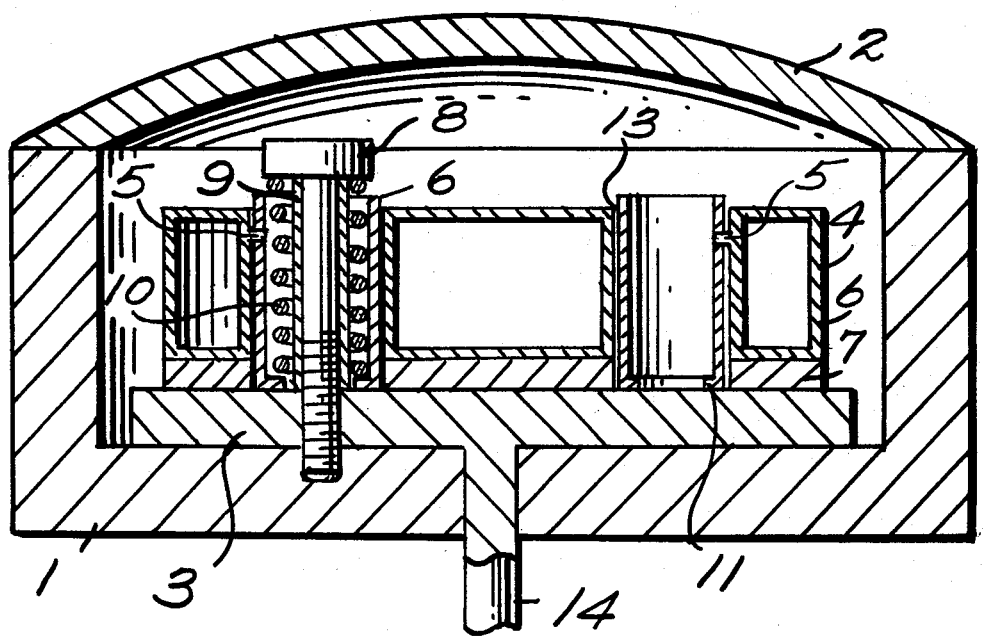
FIG. 1 schematically shows a longitudinal section of the connection head of the apparatus of the invention.
Figure 2:
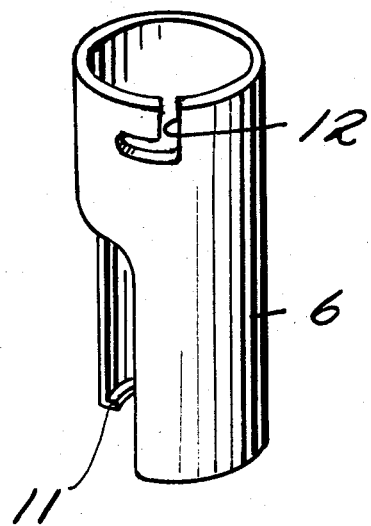
FIG. 2 shows the casing in perspective.

The connection head consists of the base body 1 and cover 2. The bottom plate 3 of the temperature probe is located in the connection head of the electrical thermometer. The probe tube 14 extends from the plate 3 through an opening in base body 1. The plate 3 is fixed, as shown on the left side of FIG. 1, to the base body 1 by means of fastener, means which include a screw or threaded bolt 8, a substantially cylindrical casing 9 and a helical spring 10. The electrical device 4 which may be a conventional electrical measuring converter sits on a carrier plate 7 for instance and is formed with two bore holes one of which is indicated at 13. There is located on the wall of each bore hole 13 one or more pins 5. There is placed over the helical spring 10 the casing 6 which is open on one side in the lower area, which casing has a J-shaped notch 12 at its top edge and a flange 11 on the bottom interior edge. The electrical device 4 having the carrier plate 7 for instance is placed with relation to the fasteners in such manner that the pins 5, after passing along the vertical portion of the notch 12, are locked in the notches 12 of the casing 6 by turning the casing 6 in the direction of the offset notch portion. Thus, there is attained a secured-fastening of the electrical device 4 in a connection head. The device 4 is loosened and removed by turning the casings 6 in the opposite direction.

The electrical device 4 is thus fixed through casing 6 that helical spring 10 presses casing 6 on the plate 3 and casing 6 presses down pin 5 resting in notch 12.

Because pin 5 is an integral part of electrical device 4, at least this device 4 is pressed on the plate 3. Thus the electrical device 4 is prevented from turning by the fastening means in the bores 13.

This equipment allows easy mounting of the electrical component in production or easy replacement in the field by simply twisting casing 6 a bit.

Plate 7 can be metal or ceramic and is used for fastening electrical device 6 or as a distance plate.

The entire disclosure of German priority application No. P. 32 44 718.3 is hereby incorporated by reference.

What is claimed is:

1. A connection device for fastening an electrical member in a connection means for an electrical thermometer having a plate member, said connection means including a housing and fastening means comprising a bolt, a casing and a spring means, said electrical member having a bore, said casing being inserted in said bore, said spring means being disposed at least partly in said casing with said bolt having a head engaging said spring means and said spring means having a portion engaging said casing so that when said bolt is attached to said housing said spring means will urge said casing toward said plate member of said thermometer.

2. The apparatus as claimed in claim 1 wherein said casing has an upper edge and a J-shaped notch extending from said upper edge, said bore of said electric member having a pin movably engaged in said notch.

3. The apparatus as claimed in claim 1 wherein said casing has a flange on its lower edge and said spring means is engaged with said flange.

* * * * *